(Model.)
B. S. BENSON.
Drive Chain.
No. 242,182. Patented May 31, 1881.
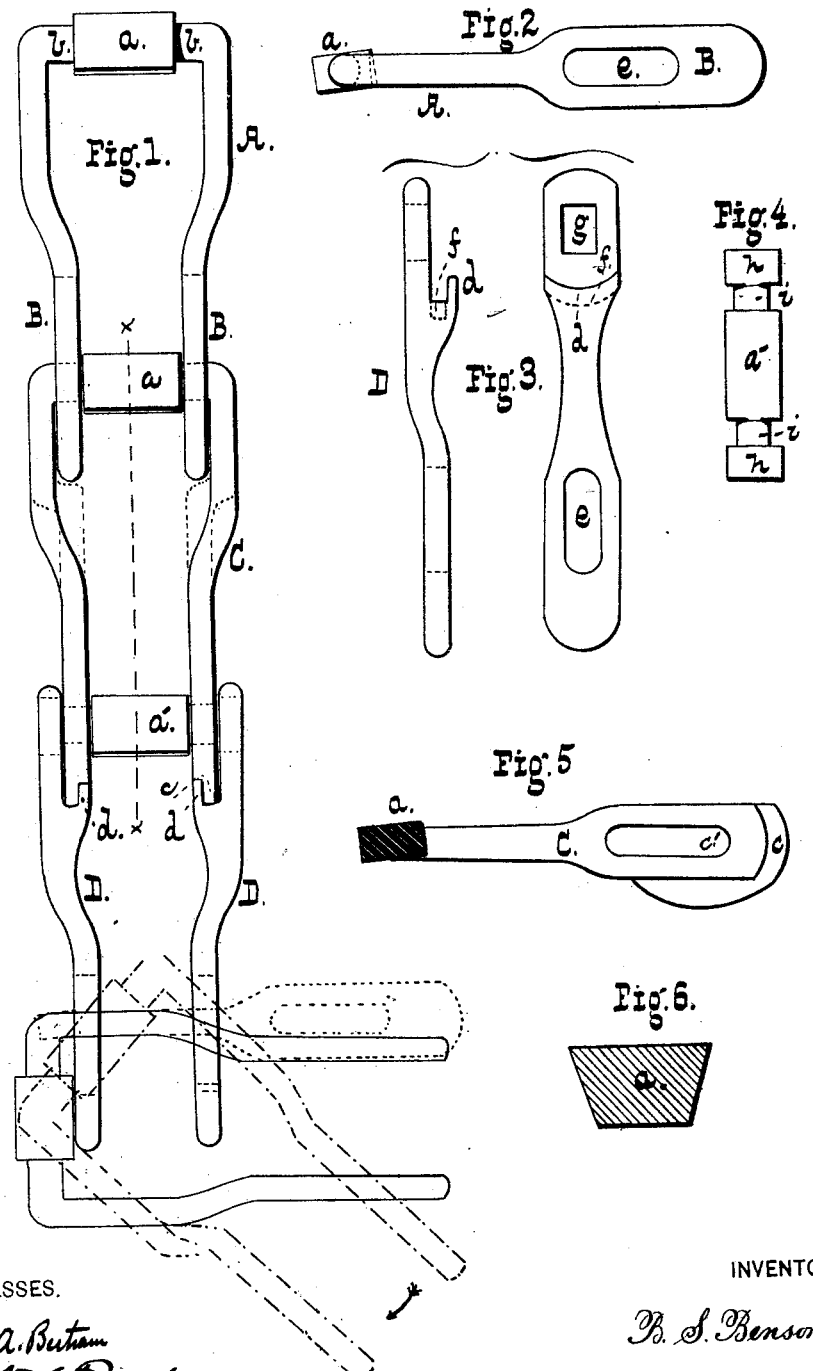
WITNESSES.
W. A. Butham
Ded. H. Barclay
INVENTOR
B. S. Benson
BY
R. D. Williams
ATTORNEY.

ly described

UNITED STATES PATENT OFFICE.

BENJAMIN S. BENSON, OF BALTIMORE, MARYLAND.

DRIVE-CHAIN.

SPECIFICATION forming part of Letters Patent No. 242,182, dated May 31, 1881.

Application filed April 11, 1881. (Model.)

*To all whom it may concern:*

Be it known that I, BENJAMIN S. BENSON, of Baltimore city, State of Maryland, have invented certain new and useful Improvements in Drive-Chains; and I hereby declare the same to be fully, clearly, and exactly described as follows, reference being had to the accompanying drawings, in which—

Figure 1 is a plan of the chain; Fig. 2, a side elevation of a single link. Fig. 3 is a side elevation and plan of one of the halves of the tie-link. Fig. 4 is a plan of the tie-pin; Fig. 5, a central sectional view, on the line $x\,x$, of the end link which joins the tie-link; and Fig. 6 is a cross-sectional view, on an enlarged scale, of the part $a$.

My invention has reference to drive-chains in general, and to separable chains in particular, and still more specifically to chains of the "weldless" or "Vaucauson" class; and my said invention consists in a chain composed of separate links, constructed and adapted for connection, substantially as hereinafter set forth.

In the drawings, A, Figs. 1 and 2, represents the chain-link, all of which are interchangeable and of the same size and shape. They are, by preference, formed by casting, the shape being such that the patterns readily draw from the sand, and but two small cores are used in each link. The end bar, $a$, is rectangular or polygonal in cross-section, and is inclined to the plane of the link at an angle equal to one-half the angle subtended by a chord joining two adjacent teeth of the sprocket-wheel. For instance, if the sprocket-wheel be a decagon—that is, if it have ten cogs—the angle at the center subtended by the line joining two of them is thirty-six minutes, and the bar $a$ would be inclined at an angle of eighteen degrees to the plane of the link. The object of this is to insure a square meeting of the bar with the cog and avoid cutting. At either side of the bar $a$ is a round journal, $b$. The sides of the link are or may be round, and the ends B are widened, and provided with slots $e$ of a length somewhat greater than the width of the part B, and of a width equal to the thickness of the journals $b$, which latter are slightly thicker than the sides of the link. The sides are curved inward to an extent equal to their own thickness, so that the outer sides of the parts B are in a line with the inner sides of the parts A. Such is the construction of the link proper, the link constituting the body of the chain. In order to connect them together the part B of one link is thrust through both slots $e$ of another, as shown by a dotted line at the bottom of Fig. 1. The first link is then turned down, so that its plane coincides with that of the second, as indicated by a fine line, and, finally, it is turned through a quadrant, bringing the two links into line, as indicated by the broken line. A third link is then attached in the same manner, and so on until the chain is complete. Now, in order to connect the end links of the chain a different link is needed. It is true a simple bolt would answer, but its nut would be liable to become unscrewed, and a riveted bolt would be difficult to remove to replace a broken link, so I have devised the links C and D. (See Figs. 3 and 5.) The link C is similar to the link A, except that it has a terminal and lateral flange, $c$, as shown. The link D is made in two parts, in one end of each of which is a slot, $e$. These parts are placed on the first link of the chain before uniting the second to it, as before described. In the opposite ends of the parts D are square or polygonal slots $g$, and between these slots and the central portions of the link are recesses and flanges $f\,d$, adapted to fit the semicircular ends and flanges of the link C.

In Fig. 4 is shown the tie-pin $a'$, having journals $i$ and heads $h$, which latter are of the size and shape of the slots $g$.

In order to connect the ends of the chain the link C is united to the terminal link, as before described, the link D having been attached to the first of the series, and the pin $a'$ is inserted in the slots of the link C. The link D is then brought up to the link C at right angles to the latter and opposite the side unprovided with a flange, $c$—namely, the outer side of the chain. The slots $g$ are then fitted on the heads $h$, and the pin $a'$ being moved to the extreme end of the slot $c'$ the two links D and C are swung into line, causing the flange $c$ to enter the recess $f$ behind the flange $d$, (see Fig. 1,) holding the parts D close to the ends of the link C. The distance between the slots $g$ and the bases of the recesses $f$ is about equal to that between the ends of slots $c'$ and the flange $c$, so that the heads $h$ of the pins $a'$ overlap the slots, and the removal of the pins is impossible while the links are connected. The flange $c$ is continued around on the inside of the link C, so that the parts D cannot be disconnected by bending the chain in the direction of the natural bend about a sprocket-wheel.

To disconnect the parts the link D is turned outward until it is at right angles to the link C, when the parts of the link D may be swung laterally away from the chain. On turning the pin $a'$ through a quadrant it may be removed, and then the links may be disconnected, *seriatim*, by reversing the manipulations first described. When it is desired that the inner edge of the links be in line substantially throughout the length of the chain the sides of the links are bent abruptly, as shown in dotted lines, Fig. 1.

Instead of casting the links they may obviously be forged; but malleable castings answer every requisite and are cheaper.

In Fig. 6 is shown the construction of the bar $a$ when the chain is used to connect two sprocket-wheels of different sizes. As the teeth of the driving-wheel act only on one side of the bars $a$ and the teeth of the driven wheel on the other the opposite faces of the bars $a$ are beveled accordingly. The angles of bevel in Fig. 6 are respectively eighteen minutes and thirty minutes, fitting a ten-cogged driver and six-cogged driven wheel.

Having thus described my invention, what I claim is—

1. A drive-chain composed of a series of separable links, having slotted side bars, polygonal end bars, $a$, and adjacent journals $b$, as set forth.

2. In combination with the chain-link A, the tie-pin $a'$, and the tie-links C D, having recessed and flanged ends adapted to engage with each other, as set forth.

3. In combination with the chain-link A, the link C and tie-pin, and the two-part link D, having slotted ends, as set forth.

4. In combination with the chain-link A, the link C, having flange $c$, the headed pin $a'$, and link D, having recesses $f$ and flanges $d$, as set forth.

5. In combination with the chain-link A, the link D, having recess and flange, as described, and the link C, having terminal flange $c$ continued upon the inner side of the link, as set forth.

BENJAMIN S. BENSON.

Witnesses:
I. C. BENSON,
BENJAMIN S. BENSON, 2d.